Patented June 28, 1932

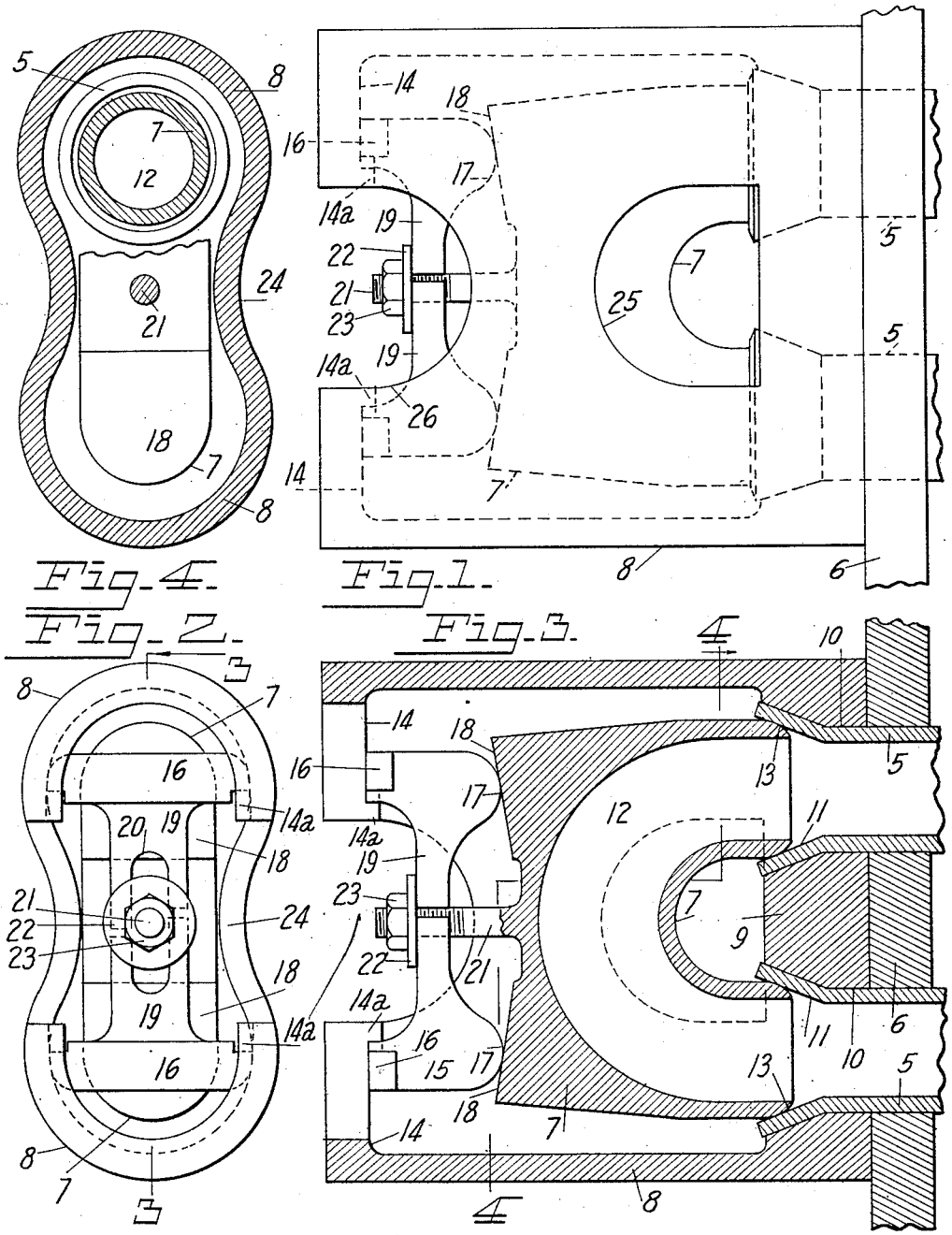

1,865,016

UNITED STATES PATENT OFFICE

WILLIAM E. KIRKPATRICK, OF SPRINGFIELD, OHIO

RETURN BEND

Application filed July 25, 1930. Serial No. 470,581.

This invention relates to a return bend for connecting the adjacent ends of tubes and is designed more particularly for use with oil stills and the like.

One object of the invention is to provide a return bend of such a character that the connection between the tubes may be quickly and easily interrupted and re-established, thus reducing the time required to clean the still and not only reducing the labor cost but materially shortening the period that the still must remain out of operation.

A further object of the invention is to provide a return bend in which the part having the conduit for connecting the tubes will be of relatively small size and can be made of expensive alloy at a relatively low cost and can be renewed without discarding the bend as a whole.

A further object of the invention is to provide a return bend in which the connecting member will have means for establishing separable fluid tight connections between the ends of the connecting conduit and the respective tubes and will be removably supported in such a position as to maintain said connections.

A further object of the invention is to provide a return bend which as a whole will be of comparatively light weight, thereby enabling it to be produced at a relatively low cost.

Other objects of the invention will appear as the device is described in detail.

In the accompanying drawing Fig. 1 is a side elevation of a return bend embodying my invention; Fig. 2 is an end elevation of the same; Fig. 3 is a longitudinal sectional view taken on the line 3—3 of Fig. 2; and Fig. 4 is a staggered section taken on the line 4—4 of Fig. 3.

In the drawing I have illustrated one embodiment of my invention and have shown the same as applied to the tubes of an oil still but it will be understood that the device may take various forms and may be connected with tubes of various kinds without departing from the spirit of the invention.

In illustrating the present embodiment of the invention I have shown the end portions only of two of the tubes of a still. These tubes are indicated by the reference numeral 5 and are mounted in a plate 6, or other suitable support, the outer ends of the tubes projecting some distance beyond the supporting plate. The return bend as here illustrated consists of two main parts, the connecting member or bend proper 7 and a supporting structure 8. The supporting structure is shown in the form of a housing having an end wall 9 provided with openings 10 to receive the projecting ends of the tubes 5, on which the supporting structure is mounted and to which it is secured in such a manner as to rigidly hold the same against outward movement with relation to the tubes. Preferably the openings 10 are flared at their outer ends and the ends of the tubes are flared in the openings, as shown at 11, the flared ends of the tubes serving not only to retain the supporting structure on the tubes but to provide seats for the ends of the connecting member as will hereinafter appear.

The connecting member 7 is provided with a conduit 12 the ends of which are so arranged that they may communicate with the tubes that are to be connected. As here shown, the connecting member is substantially U-shaped in form and the ends of the conduit open through the two arms of the U-shaped structure, thus providing the connecting member with parts surrounding the ends of the conduits and adapted to enter the flared ends of the tube and engage the inner surface thereof to form tight joints. Preferably the ends of the arms of the connecting member are rounded, as shown at 13, to provide sealing contact with the surfaces of the flared tubes and to permit the connecting member to automatically adjust itself with relation thereto. The conduit is of substantially uniform diameter throughout its length and the walls are smooth. Further, the conduit is of a capacity substantially the same as the capacity of the tubes. Consequently there will be a free flow of fluid through the conduit and there will be no retardation of or interference with the flow of the fluid such as takes place in that type of return bend in which the openings in the bend leave recesses in the wall of the conduit or where the connection between the conduit and the tube is such as to restrict the flow.

Suitable means are provided for pressing the connecting member into firm engagement with the ends of the tubes and for supporting the same in that position, this means being so arranged that it will act against the supporting structure or housing 8 and against the connecting member. In the present construction the housing 8 projects outwardly beyond the end of the connecting member and has at its outer end laterally extending flanges providing inwardly facing shoulders 14. Interposed between these shoulders and the outer end of the connecting member is a suitable device for exerting inward pressure on the connecting member. This device is here shown as comprising clamping members 15 each of which comprises a cross bar 16 of such a length that its ends will seat behind the adjacent shoulders on the outer end of the housing. Opposite the cross bar the clamping member is provided with a round or cam-shaped surface 17 adapted to engage the adjacent portion of the connecting member, the outer surfaces of the connecting member being here shown at 18 as inclined to cooperate with the clamping member. Each clamping member has an arm 19 by means of which it may be actuated to cause the cam shaped portion thereof to exert pressure on the inclined surfaces of the connecting member, the movement of the transverse bar 16 being limited by lugs 14a at the ends of the shoulder 14. In the present instance, the arm 19 is slotted, as shown at 20, to embrace a stud 21 projecting outwardly from the connecting member 7, this stud being rigidly secured to, and, if desired, formed integral with the connecting member. Mounted on the stud are means for pressing the arm inwardly to cause the clamping members to exert pressure on the connecting member, this means in the present instance comprising a washer 22 to engage the arms of the two clamping members and a nut 23 threaded on the end of the stud to force the washer inwardly. When the connecting member has been placed in position the clamping members are inserted by first passing the bar of each clamping member through the open end of the housing to a position in engagement with the shoulder 14 then moving the arm 19 inwardly to bring the cam shaped portion of the clamping member into engagement with the end of the connecting member, this movement also bringing the end of the arm into a position adjacent to the stud 21. The washer 22 and nut 23 are then placed on the stud and the nut tightened down to force the arms inwardly, thus causing the cam shaped portions of the clamping members to move over the inclined surfaces on the end of the connecting member and force the connecting member inwardly to press those parts of the connecting member which surround the ends of the conduit into firm sealing contact with the tubes. It is not necessary that the ends of the arms 19 of the clamping members should embrace the stud 21 but this arrangement serves to hold the clamping members against lateral displacement and it is therefore desirable.

The supporting structure may take any suitable form and it is not essential that it should enclose the connecting member. Its principal purpose is to provide means against which the clamping members, or other pressure means, may act to press the connecting member into engagement with the tubes and to support the same in that position. As here shown, the housing extends entirely about the connecting member and has its lateral portions curved to conform substantially to the curvature of the adjacent portions of the connecting member, the inner diameter of these curved portions of the housing being somewhat greater than the diameter of the adjacent portions of the connecting member so as to provide a space between the same. The side walls of the housing are curved inwardly as shown at 24 and their inner surfaces are spaced apart a distance only slightly greater than the thickness of the connecting member, thus serving to position the connecting member and guide the same into engagement with the tubes. The side walls of the housing are cut away to provide openings, as shown at 25 and 26, thus reducing the weight of the housing and cheapening its construction. Further, the opening 25 provides means whereby a bar or other suitable implement may be inserted in the housing to engage the connecting member and disengage the same from the tubes in case the ends thereof should have adhered tightly to the tubes. The opening 26 enables ready access to be had to the clamping members and the actuating means therefor.

It will be obvious therefore that the device is of such a character that the connection between the tubes can be quickly and easily interrupted by removing the nut 23 to release the clamping members and then withdrawing the connecting member, and that the connection can be as quickly and easily restored by reinserting the connecting member and tightening down the clamping members. The connecting member being separate from the supporting structure can be renewed without renewing the return bend structure as a whole. This not only materially reduces the amount of metal which must be discarded but enables the replacement to be made without removing the structures as a whole from the tubes. Further, this separate construction of the connecting member enables it to be manufactured from high priced alloys, which are less subject to corrosion, at a relatively small cost. The return bend as a whole may be manufactured at a low cost because of its relatively light weight and because of the small amount of machine work that is required, the contacting ends of the U-shaped connecting member being the only parts that require machining, with the exception of the forming of the thread on the stud 21. The device may be used for connecting more than two tubes, by obvious changes in the connecting member, and when so used it is usually referred to as a "header".

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a return bend for connecting the ends of a pair of tubes, said ends being flared, a tubular connecting member having its ends adapted to enter the flared ends of said tubes and form tight joints therewith, a supporting structure mounted adjacent the ends of said tubes and extending outwardly beyond said connecting member, clamping members interposed between the outer portion of said structure and the outer end of said connecting member and having cam shaped surfaces to engage said connecting member, and a device connected with said connecting member to actuate said clamping members to cause the same to press said connecting member toward said tubes.

2. In a return bend for connecting the ends of a pair of tubes, a housing having openings to receive said tubes, the ends of said tubes being flared to retain said housing thereon, a tubular connecting member mounted within said housing and having its ends rounded and adapted to enter the flared ends of said tubes and form tight joints therewith, and a pressure exerting device interposed between said housing and said connecting member to press the ends of the latter into engagement with said tubes.

3. In a return bend for connecting the ends of a pair of tubes, a housing having at one end openings to receive the ends of said tubes, said ends of said tubes being flared to retain said housing thereon, said housing having its other end open and provided with inwardly facing shoulders, a tubular connecting member adapted to be inserted in said housing through the open end thereof and having its ends arranged to engage the ends of the respective tubes and form tight joints therewith, clamping members interposed between said connecting member and said housing and each comprising a transverse portion to engage the adjacent shoulders on said housing, and a cam shaped portion to engage the adjacent end of said connecting member and also having a laterally extending arm to move said cam shaped portion with relation to said connecting member, a stud secured to said connecting member and extending beyond said arms, and means carried by said stud for engaging the arms of said clamping members and imparting operative movement to the latter.

4. In a return bend for connecting the ends of a pair of tubes, a connecting member having a conduit and having parts surrounding the respective ends of said conduit to engage the respective tubes and form joints therewith, a structure mounted adjacent to the ends of said tubes and held against outward movement with relation thereto, pressure members interposed between said connecting member and said structure and arranged to act on said connecting member to press said parts thereof into engagement with the respective tubes, and means for actuating said pressure members in unison.

5. In a return bend for connecting the ends of a pair of tubes, a tubular connecting member having its ends arranged to engage said tubes and form tight joints therewith, a supporting structure mounted adjacent said tubes, extending outwardly beyond said connecting member and having inwardly facing shoulders, clamping members each having a part to engage one of said shoulders and having a second part to engage the adjacent end of said connecting member, and means for actuating said clamping members in unison to cause the same to exert inward pressure on said connecting member.

In testimony whereof, I affix my signature hereto.

WILLIAM E. KIRKPATRICK.